Jan. 23, 1973

R. D. McRAY 3,713,022

CAPACITANCE MEASUREMENT BY PHASE-CONTROLLED SAMPLING

Filed Dec. 17, 1971

INVENTOR
ROBERT D. McRAY

Charles W. Helzer
ATTORNEY

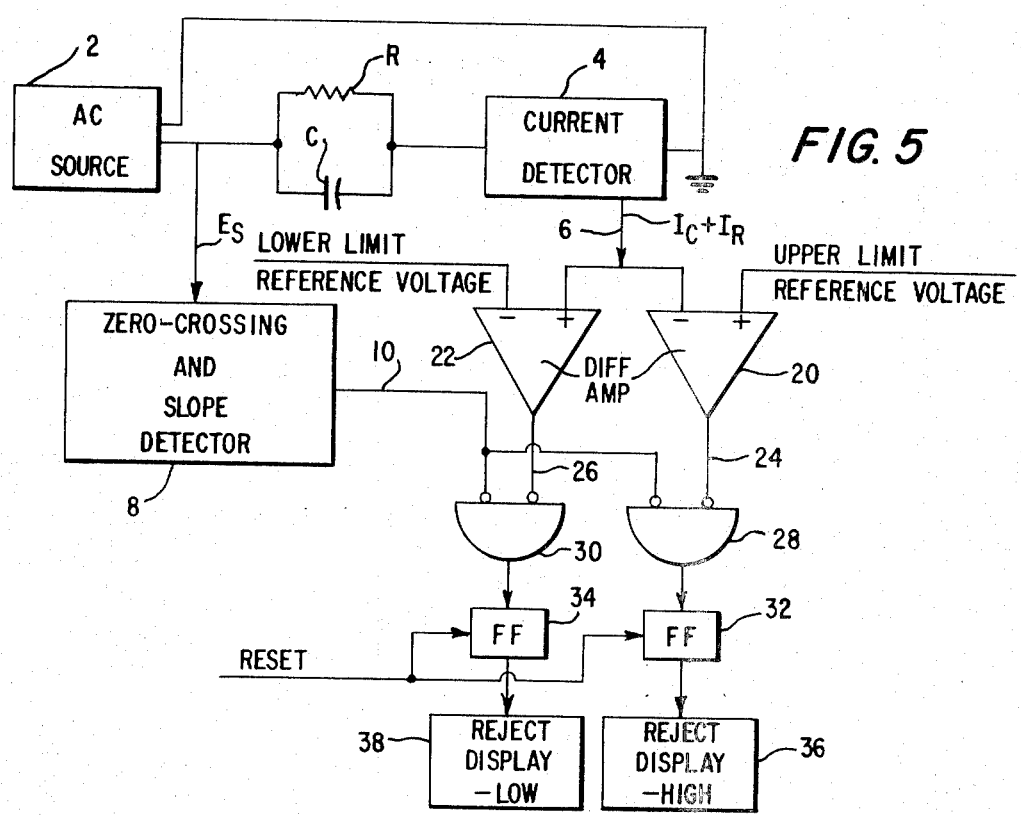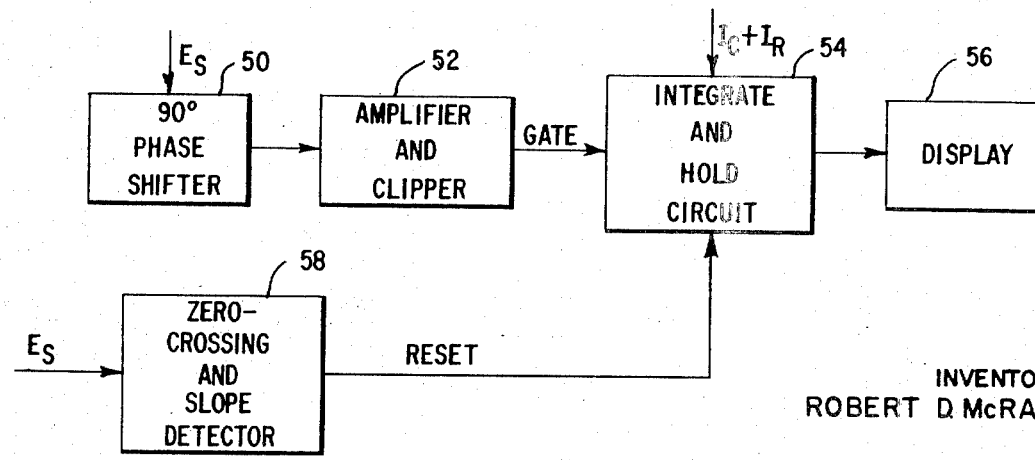

FIG. 6
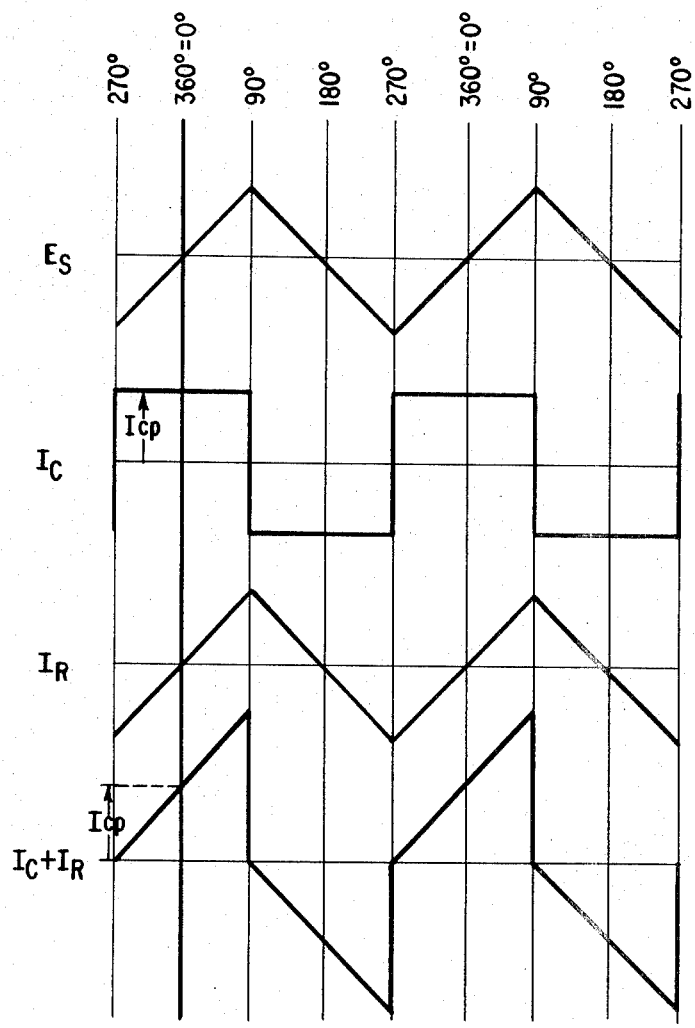
FIG. 8
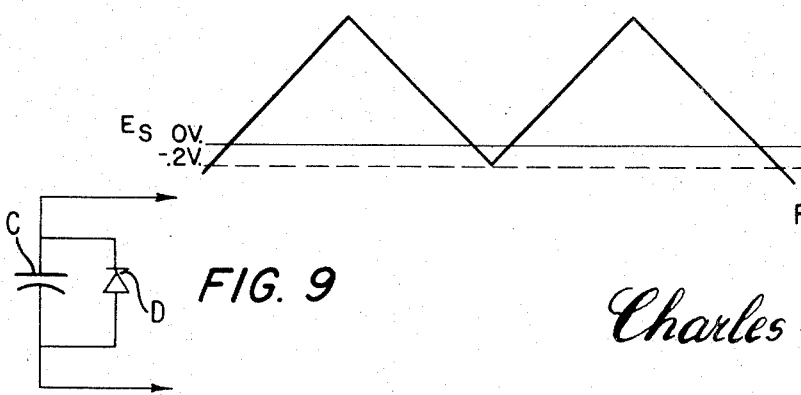
FIG. 9

3,713,022
CAPACITANCE MEASUREMENT BY PHASE-CONTROLLED SAMPLING
Robert D. McRay, Scotia, N.Y., assignor to Systomation Incorporated, Elnora, N.Y.
Filed Dec. 17, 1971, Ser. No. 209,062
Int. Cl. G01r 27/26
U.S. Cl. 324—60 C         11 Claims

ABSTRACT OF THE DISCLOSURE

Measurement of values of unknown capacitors while connected in parallel with unknown resistors by timing the measurement to occur at the phase point where the resistor current is zero. The timing is provided by a zero crossing and slope detector.

BACKGROUND OF THE INVENTION

Field of the invention

This invention relates to a system for measuring the capacitance value of a capacitor while it is connected in parallel with a resistance of unknown value. The system also allows for the simultaneous measurement of a resistor and a capacitor in parallel by use of two separate strobe circuits (as described hereinafter) used in conjunction with two separate limit comparators or sample and hold circuits, etc.

Description of the prior art

Using prior art devices and techniques, the measurement of the value of a capacitor which is connected into a circuit under test presents certain problems. One known technique is to disconnect one side of the capacitor and test directly. It is also possible to measure complex impedance and phase angle values, then calcuate capacitance from these values. However, such prior art systems can be fooled by the substitution of a resistor for the capacitor under test and require complex calculations that are not readily conducted by an unskilled technician. To overcome these problems, the present invention was devised.

SUMMARY OF THE INVENTION

The present invention takes advantage of the inherent phase-shift characteristics of the capacitor under test to identify and separate its contribution to the parallel combination of resistive and capacitive current. By using the fact that the current through a parallel resistor is zero at the 0° and 180° points of the applied voltage, one can assume that the total parallel current at that instant is all capacitor current, and measurements can be based on that assumption.

Also, by using the fact that the integral of the current through a parallel resistor is zero either from 90° to 270° or from 270° to 90° of the applied voltage, while the integral of the current through the capacitor is proportional to the area under a complete half cycle, one can measure the integral of the current through the capacitor.

BRIEF DESCRIPTION OF THE DRAWINGS

FIG. 5 is a circuit diagram of another embodiment of the invention, operating to sample-and-hold conditions outside predetermined limits;
FIG. 6 is a diagram of various triangular and square waveforms and mixtures thereof occurring in the circuit of FIG. 1;
FIG. 7 is a circuit diagram of another embodiment of the invention, using an integrate-and-hold circuit to establish output relationships;
FIG. 8 is a characteristic waveform of a test voltage waveshape showing a modification of the invention whereby the effect of parallel connected semiconductor junctions can be negated;
and
FIG. 9 is a schematic diagram of a parallel network comprised by a capacitor and semiconductor diode that can be measured with the technique depicted by FIG. 8.

DESCRIPTION OF THE PREFERRED EMBODIMENTS

Figure 1:
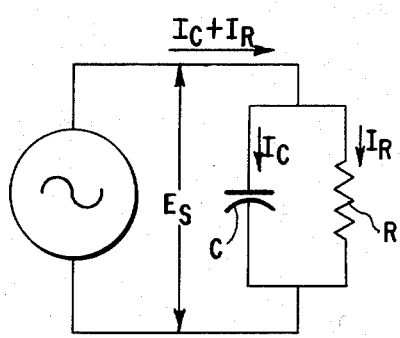
FIG. 1 is a basic prior art circuit diagram to explain the relationships involved.
Figure 2:
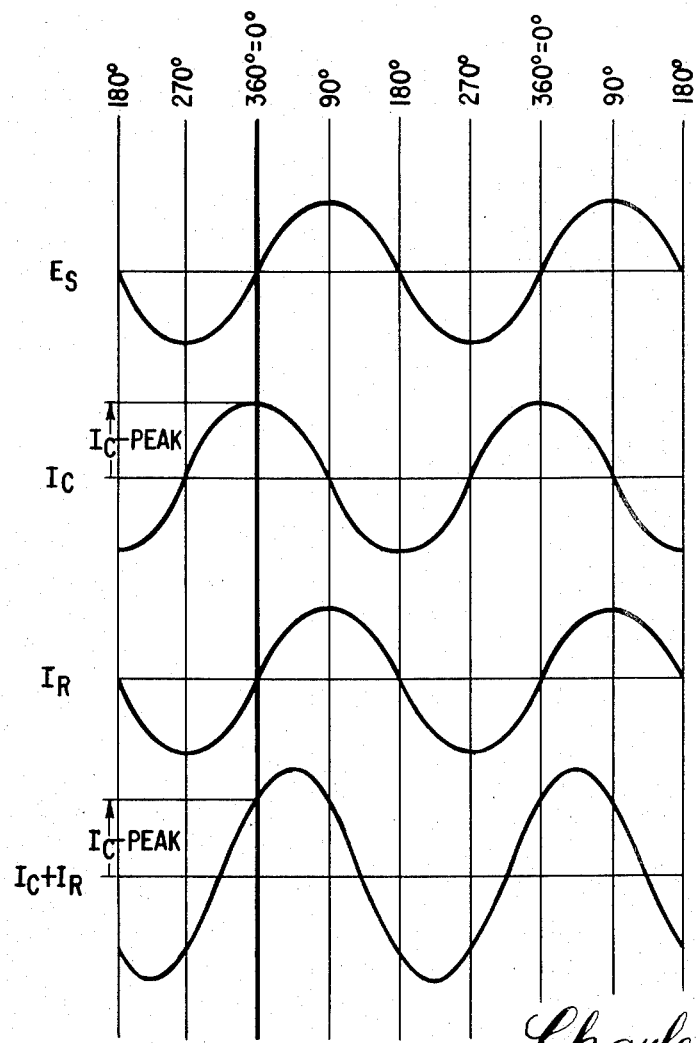
FIG. 2 is a diagram of sinusoidal waveforms occurring in the circuit of FIG. 1.

FIG. 1 is a circuit diagram explaining some of the relationships involved. When a capacitor C is connected in parallel with a resistor R and an alternating voltage $E_s$ is impressed across the parallel RC circuit, a current $I_R$, which is in phase with voltage $E_s$, as shown in FIG. 2, passes through resistor R. A current $I_c$, which leads the impressed voltage by 90°, passes through the capacitor. The total current $I_c+I_R$ has a phase angle between that of $I_c$ and that of $I_R$. It is noteworthy that, when the applied voltage $E_s$ is passing through zero, the instantaneous value of $I_R$ is zero. Thus, $I_c+I_R=I_c+0=I_c$ at that instant. Therefore, by measuring the value of $I_c+I_R$ at the instant when $E_s$ passes through zero, one can read directly the peak value of $I_c$. Since $E_s$ and the input frequency can be held constant, the peak value of $I_c$ can be made directly proportional to the capacitance of C, allowing direct readout of C when $E=0$. In a similar manner when $E_s$ passes through 90°, $I_c$ is zero and $I_R$ is a max since it is in phase with $E_s$.

Figure 3:
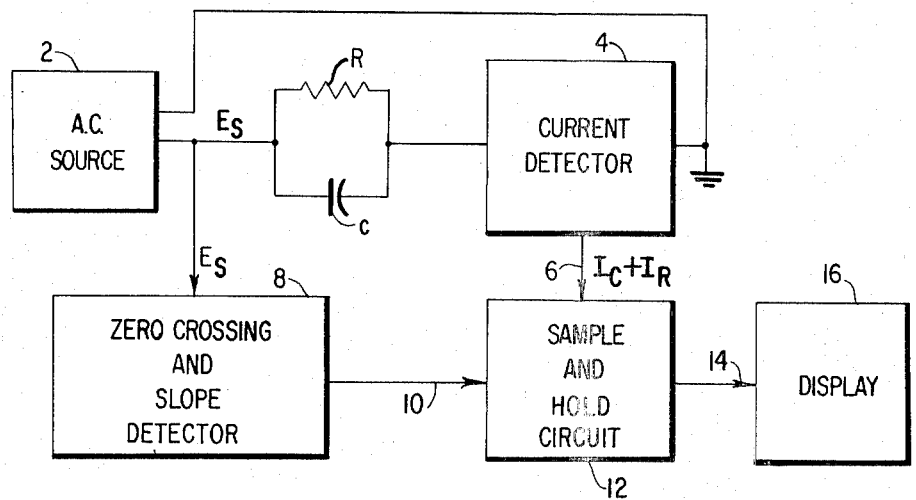
FIG. 3 is a circuit diagram of one embodiment of the invention, using a sample-and-hold circuit to establish output relationships.

FIG. 3 is a block diagram of one embodiment of the invention. An A.C. source 2 impresses a potential $E_s$ across a parallel combination of a resistor R and a capacitor C. The resulting total parallel current through R and C is measured by a conventional current detector 4, which may be a differential amplifier connected across a small series resistance, and which provides an output signal on line 6 proportional to instantaneous values of $I_c+I_R$.

Figure 4:
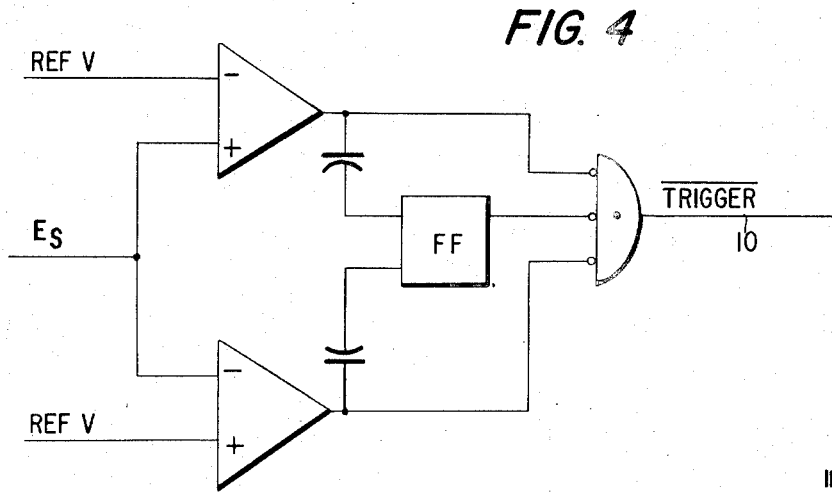
FIG. 4 is a circuit diagram of a zero-crossing and slope detector for use in the circuit of FIGS. 3, 5 and 7.

A zero-crossing and slope detector circuit 8, which may be constructed as illustrated in FIG. 4, detects the times when $E_s$ is passing through zero and rising. As can be seen from FIG. 2, these times correspond to the zero-phase point at which $I_R$ is zero and $I_c$ is at its peak. Circuit 8 also can derive an output indication when the slope is zero (i.e., $E_s$ passing through 90°). Hence, by appropriate adjustment of circuit 8, an output signal can be derived for strobing purposes either at $E_s=0$ and $$I_c+I_R=I_c+0=I_c$$

or at $E_s=E_{max}$ at 90° and $I_c+I_R=0+I_R=I_R$.

A trigger signal on line 10 from circuit 8 is used to trigger operation of a conventional sample-and-hold circuit 12. Circuit 12 holds the value attained by the signal $I_c+I_R$ on line 6 at the instant of occurrence of the trigger from line 10. The signal thus held is provided on line 14 to a display unit 16, which may be an ordinary D'Arsonval meter. The value displayed by unit 16 is proportional to the peak value of $I_c$ and thus to the capacitance of element C. By proper calibration, unit 16 can display capacitance values directly. By the provision of two zero crossing and slope detectors, one to read $I_c$ and the other to read $I_R$, at appropriate points in the applied test voltage $E_s$, and the provision of two sample and hold circuits, both the resistance and capacitance values of a parallel resistor and capacitor can be read out.

FIG. 5 is a block diagram of another embodiment of the invention, adapted to operate in a GO/NO-GO mode. Elements 2, 4, 6, 8, 10, R and C are as described in connection with FIG. 3. The value of $I_c+I_R$ is continuously compared with upper and lower limit reference voltages respectively in inverting differential amplifiers 20 and 22 to provide outputs respectively on lines 24 and 26, which each will be DOWN when $I_c+I_R$ is within limits. Lines 24 and 26 are respectively connected to one input of NOT-AND gates 28 and 30. The zero crossing signal on line 10 is connected to the other input of each of the gates 28 and 30. The outputs of gates 28 and 30 are connected to be stored respectively in flip-flops 32 and 34. These flip-flops respectively provide an output to display units 36 and 38 if the capacitor should be rejected as high or low. These display units may be indicator lamps. The reset signal can be provided in various ways, for instance by a down-going zero-crossing trigger.

FIG. 6 is a waveform chart demonstrating the waveforms used with an integrate-and-hold system in place of a sample-and-hold system. A triangular A.C. input voltage $E_s$ is used, causing a square capacitor current $I_c$ and a triangular resistor current $I_R$. The parallel sum current $I_c+I_R$ has an odd shape. The integral of $I_R$ from 270° to 90° or from 90° to 270° is zero, while the integral of $I_c$ over the same range is the same as the peak value of $I_c$ multiplied by the range. Thus the integral of $I_c+I_R$ over the same range is the same as the integral of $I_c$ over that range. This integral, for a given slope and repetition rate of input signal, is directly proportional to the value of C.

FIG. 7 is a block diagram of an integrate-and-hold system corresponding to the sample-and-hold system of FIG. 3. Elements 2, 4, R and C are present in the system but omitted from the diagram of FIG. 7. The signal $E_s$ is shifted by 90° in shifter 50 and is amplified and clipped in unit 52 to provide a gate signal which is UP from 90° to 270°. This gate signal causes integrate-and-hold circuit 54 to integrate signal $I_c+I_R$ from 90° to 270° and to hold the resulting value until reset. Display unit 56 displays the held value until unit 54 is reset at 0° by a signal from zero-crossing and slope detector 58. Unit 58 detects an upward-going zero crossing of voltage $E_s$. Other reset times could be used. For example, by providing two integrate-and-hold circuits, one to integrate signal $I_c+I_R$ from 90° to 270° and the other from 0° to 180° both capacitance and resistance values can be measured. It is possible to use the integrate-and-hold apparatus for a sinusoidal input or to use a triangular input with sample-and-hold apparatus. Further, a system such as that shown in FIG. 5 can be adapted to an integrate-and-hold mode of operation by use of an integrate-and-hold unit before comparison with reference values.

FIGS. 8 and 9 of the drawings illustrate a modification of the above-described technique employing a triangular wave shape source of potential whereby it is possible to measure a capacitor connected directly in parallel with a semiconductor junction. In FIG. 9 the capacitor C to be measured is directly connected in parallel circuit relationship with a semiconductor junction formed by a diode D. As shown in FIG. 8 of the drawings, if the source voltage $E_s$ is shifted by the application of a small direct current bias of the order of —.2 volt in a manner such that the negative peak of the triangular wave shape source voltage $E_s$ never is more negative than —.2 volt with respect to ground, the capacitor C may be measured even with the semiconductor junction of diode D connected directly in parallel with it. This can be done since the diode D will not be forced into conduction, hence, any effects of the diode are eliminated from the measurement. It might also be noted that this same procedure can be employed in the presence of a parallel connected resistance in the manner described above.

Because the measurement described in the preceding paragraph is dependent primarily only on the slope of the triangular-wave shape source voltage $E_s$, the peak to peak value of $E_s$ has no effect on the measurement reading of capacitor C. Hence, if $E_s$ is made small enough so that it does not exceed .4 volt peak to peak value, then the DC off-set voltage illustrated in FIG. 8 would not be required. The use of such a low magnitude source voltage would cause less error current to be produced in parallel connected resistive type components and thus help prevent the measurement amplifier from being driven to its voltage limits.

From the foregoing description, it will be appreciated that the present invention can be employed in a wide variety of measuring instruments to enhance the performance of such instruments. For example, the invention can be readily incorporated into a preprogramed, automatically operating circuit testing equipment of the type which upon connection of a test circuit through an appropriately designed fixture, automatically tests preselected points in the circuits to determine that they meet desired standards. There is one such known, commercially available equipment which employs a technique of guarding-out parallel connected components so as to in effect prevent such parallel connected components from affecting the measurement of a desired component. With equipment of this nature, the present invention could greatly reduce the amount of guarding necessary during measurement of capacitor components. Further, the use of the invention would enhance the ability of such equipment to measure a capacitor with a resistive element connected directly in parallel with it in a wider variety of measuring situations than presently is possible where only certain favorable ratios of resistance and capacitance can be measured with the known equipment. Also, because the present invention utilizes the phase shift of the capacitor under test in effecting a desired measurement, the arrangement cannot be easily fooled by the substitution of a resistor for the capacitor as is the case with some presently available equipments. Additionally, a considerable increase in the speed of measurement can be accomplished with instruments employing the present invention by reason of the sampling or integrating technique whereby capacitors may be measured within one or two cycles from the commencement of the measurement. Also, as pointed out previously, by using two different strobe points as well as two different sample-and-hold circuits, a parallel connected resistor and capacitor under test can be measured simultaneously at much faster measuring rates than is possible with the present equipment. Finally, it is possible to adapt hand-carried measuring instruments of the guarding type to include the present invention and thereby accomplish substantially the same improvements as are noted above with respect to known preprogrammed equipments. Because of the design of such hand-carried instruments, very little modification would be required in order to incorporate and utilize the present invention.

In addition to the above-listed desirable characteristics, there are certain additional benefits to be derived from the use of the invention with a triangular waveform measurement voltage source $E_s$. It is particularly advantageous to use such a triangular-wave shape source voltage when measuring capacitance with equipment having a differentiator type measurement amplifier due to the fact that increased measurement amplifier stability can be achieved because the input current from the capacitor is constant in value. This is in contrast to the continuously varying current from a sinusoidal waveform measuring voltage source which causes a rather large degree of instability in measurement amplifiers of the differentiator type and which are normally used for the measurement of capacitance values. Further, where sample-and-hold circuits or window comparator circuits are used, only the slope of the source voltage waveform $E_s$ becomes critical. The peak to peak value of the voltage and frequency have no effect on the measurement of the capacitor where a triangular wave shape test voltage $E_s$ is employed. Since it is fairly simple and not too costly to provide a measuring voltage source $E_s$ having a required slope accuracy and to make it programmable, the measurement amplifier can be designed to operate at a specific current, thereby minimizing the amount of stabilizing circuitry that otherwise would be required. Lastly, with conventional voltage detection circuits of the type employing alternating current to direct current converters and limits, the resulting square wave output from the measurement amplifier can be AC to DC converted very rapidly and with minimum filtering, thereby speeding-up the measurement process.

Although the invention has been described in considerable detail with reference to certain preferred embodiments thereof, it will be understood that variations and modifications can be effected within the spirit and scope of the invention as described above and as defined in the appended claims.

What is claimed is:

1. A system for measuring the capacitance value of a capacitor while it is connected in parallel with a resistor of unknown magnitude comprising:
   (A) potential means for applying an alternating potential of a given magnitude and frequency across the parallel combination of the capacitor and the resistor, thereby to produce a resistive current through the resistor and a capacitive current through the capacitor,
   (B) detector means for providing a measurement signal instantaneously proportional to the sum of the capacitive current and the resistive current,
   (C) sample means responsive to a trigger signal for sampling a phase-limited portion of said measurement signal to obtain an output value,
   (D) trigger means responsive to said alternating potential for generating said trigger signal at a given phase of said alternating potential for causing said output value to vary in direct relationship to said capacitance value, and
   (E) measurement means responsive to said sample means for providing an output indication of said output value.

2. A system according to claim 1 wherein said sample means comprises means responsive to said trigger signal for sampling said measurement signal and holding the value obtained by said sampling, and wherein said trigger means comprises means for generating said trigger signal when said alternating potential is passing through an instantaneous zero while changing toward a predetermined polarity.

3. A system according to claim 1 wherein said sample means further comprises:
   (A) means for comparing said measurement signal with a predetermined limit to generate a comparison signal which assumes a given polarity only when the measurement signal exceeds the limit,
   (B) gate means responsive to said trigger signal for providing a given output signal only when the measurement signal exceeds said limit at the instant of said trigger signal, and
   (C) storage means for storing an indication of the occurrence of said given output signal from the gate means,
thereby providing a GO/NO-GO stored output signal.

4. A system according to claim 3 further comprising:
   (A) an additional comparing means for comparing said measurement signal with an opposite predetermined limit to generate a second comparison signal which assumes a given polarity only when the measurement signal exceeds said opposite limit,
   (B) detector means for providing a measurement signal for providing a second given output signal only when the measurement signal exceeds said opposite limit at the instant of said trigger signal, and
   (C) second storage means for storing an indication of the occurrence of said second given output signal from said second gate means,
whereby the stored output signals provide a two-limit GO/NO-GO function.

5. A system according to claim 1 wherein said sample means comprises means operable for the duration of said trigger signal for integrating said measurement signal and for holding a value obtained by said integrating at the end of the duration of said trigger signal, and wherein said trigger means comprises means for generating said trigger signal occurring once per cycle and having a duration extending for an equal phase angle in each direction from the instant when said alternating potential passes through an instantaneous zero.

6. A system according to claim 5 wherein said phase angle in each direction comprises 90° in each direction from said instant of instantaneous zero.

7. A system according to claim 1 wherein said alternating potential comprises a symmetrical triangular waveform.

8. A system according to claim 1 wherein said alternating potential comprises a symmetrical sinusoidal waveform.

9. A system for measuring the reactance value of a reactor while it is connected in parallel with a resistor of unknown magnitude, comprising
   (A) potential means for applying an alternating potential of a given magnitude and frequency across the parallel combination of the reactor and the resistor, thereby to produce a resistive current through the resistor and a reactive current through the reactor.
   (B) detector means for providing a measurement signal instantaneously proportional to the sum of the reactive current and the resistive current,
   (C) sample means responsive to a trigger signal for sampling a phase-limited portion of said measurement signal to obtain an output value,
   (D) trigger means responsive to said alternating potential for generating said trigger signal at a given phase of said alternating potential for causing said output value to vary in direct relationship to said reactance value, and
   (E) measurement means responsive to said sample means for providing an output indication of said output value.

10. A system according to claim 9 wherein said sample means comprises means responsive to said trigger signal for sampling said measurement signal and holding the value obtained by said sampling, and wherein said trigger means comprises means for generating said trigger signal when said alternating potential is passing through an instantaneous zero while changing toward a predetermined polarity.

11. A system according to claim 9 further including means for maintaining the absolute value measured with respect to ground of the alternating current potential supplied from said potential means at a level such that semiconductor junctions connected in parallel circuit relationship with a reactor being measured are not forced into conduction and hence do not adversely influence the measurement.

References Cited

UNITED STATES PATENTS 2,080,308    5/1937    Frazier _____ 324—60 C
3,453,535    7/1969    Anglin _____ 324—60 C

FOREIGN PATENTS 902,057    11/1944    France _____ 324—60 C

STANLEY T. KRAWCZEWICZ, Primary Examiner

U.S. Cl. X.R.

328—114, 115, 151